Dec. 29, 1936.   R. BURSTON   2,066,136
MEANS FOR INSTALLING VALVE SEATS
Filed May 14, 1934
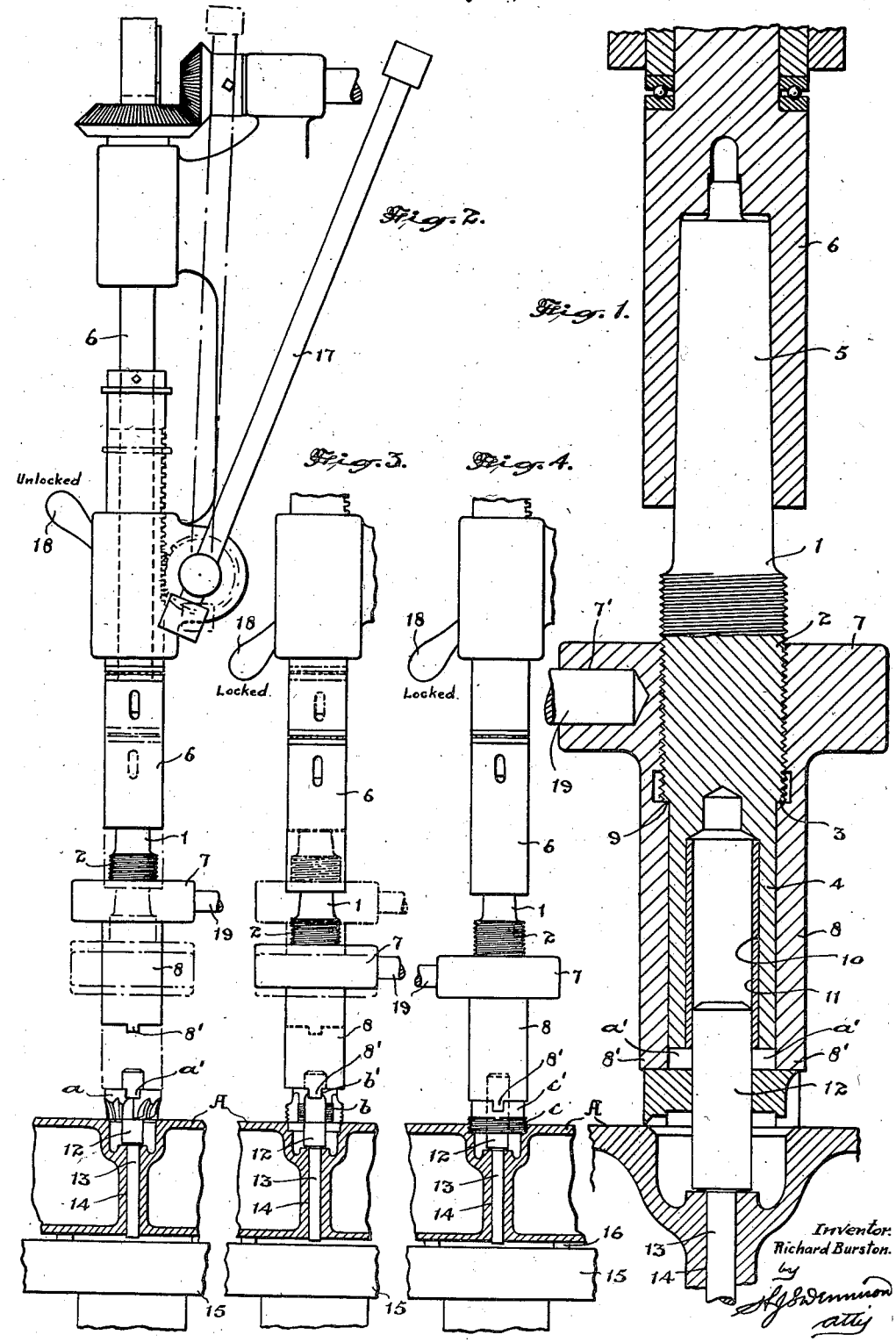
Inventor:
Richard Burston.

Patented Dec. 29, 1936

2,066,136

UNITED STATES PATENT OFFICE 2,066,136

MEANS FOR INSTALLING VALVE SEATS

Richard Burston, Toronto, Ontario, Canada

Application May 14, 1934, Serial No. 725,430

2 Claims. (Cl. 29—1)

The principal objects of this invention are to greatly simplify the work required in the installing of valve seats, particularly in connection with internal combustion engines and to provide a form of device for carrying out certain of the operations by machine power, thereby effecting a considerable saving of time and ensuring the accurate fitting of the seat.

A further object is to provide a form of device which will cooperate directly with the spindle of a drill press or lathe to be driven or rigidly supported thereby in accordance with the operations being performed.

The principal feature of the invention consists in the novel construction and arrangement of parts whereby a pair of sleeve and spindle members are provided, one of which is adapted to be secured in a rotatable machine spindle and either rotated thereby or held rigidly in a fixed position, while the other threaded member is adapted to be rotatably interlocked with the first-mentioned member or be rotated in relation to the first-mentioned member; in accordance with the particular operation to be performed in the installing of the valve seat.

In the drawing, Figure 1 is a mid-sectional elevational view of the device constructed in accordance with the present invention showing same mounted in a machine spindle in readiness to commence the operation of milling the recess to receive the insert valve seat.

Figure 2 is an elevational view of a portion of a drill press showing my improved device mounted in the spindle thereof with the spindle about to be lowered to engage the milling tool.

Figure 3 is a view similar to Figure 2, but showing the spindle lowered for co-operation with the threading tool and locked against rotation and axial movement.

Figure 4 is a view of the structure shown in Figure 3 showing same in position having threaded a renewal valve seat into place.

In my former United States Patent No. 1,888,259, granted November 22, 1932, I disclose a method and means for installing valve seats. The present invention has been devised as an improvement thereover as to greatly facilitate the work required and to reduce to the minimum the manual labour required.

In my former patent above referred to the device was in the form of a bracket or jig which was required to be clamped to the engine block under treatment and manipulation of the device was a manual task which was slow and tedious. The present invention eliminates these difficulties and provides a form of device which can be mounted directly in a machine spindle.

According to the form of the invention shown I provide a spindle 1 having an enlarged externally threaded portion 2 intermediate of its length formed with an annular shoulder 3 beyond which a cylindrical concentric portion 4 extends, the other end of the spindle 1 being formed preferably as a tapered shank 5 to fit the standard tapered orifice of a drill press spindle 6 of a suitable drill press indicated in part in Figure 2.

A flanged collar 7 is threaded on the threaded portion 2 of the spindle 1 and is provided with a sleeve extension 8 encircling the sleeve extension 4 of the spindle in snug guiding contact, the sleeve 8 being shouldered at its upper end at 9 to be engaged by the shoulder 3 of the spindle so that the spindle and sleeve will be rotatably locked together during rotation of the machine spindle 6.

The bore 10 of the sleeve 4 is here shown provided with a concentric guide bearing lining 11 which is adapted to engage in guiding contact with a centering spindle 12, the lower reduced end 13 of which is adapted to be inserted in the valve guide 14 of an engine block.

In the operation of the device, the engine block or head A will be suitably levelled on a base plate 15 of a drill press, which plate will preferably be adjustable and suitable spacing blocks 16 may be inserted under the head or block.

The guide spindle 12 is then dropped into place in the valve guide 14 and an end mill a is then slipped over the upper guide end 12 as indicated in Figures 1 and 2.

By manipulation of the feed handle 17 on the drill press the spindle 6 thereof is then lowered so that the guide spindle 12 enters the guide sleeve 11 of the spindle while at the same time the driving lug projections 8' of the outer sleeve 8 are brought into engagement with the diametrically opposite notches a' formed in the end mill as indicated in the dotted line position Figure 2 and as shown in detail in Figure 1.

The drill spindle 6 is then rotated from a suitable source of power while the handle 17 is operated to feed the spindle downwardly, and since the shoulders 3 and 9 will be in engagement as shown in Figure 1, the sleeve 8 will rotate in unison with the machine spindle 6 and will be fed downwardly by the operation of the handle 17 so that the end mill a will not only be rotated, but will be pressed axially so that the metal will be cut away and an annular recess is formed of a suitable depth and in true alignment with the valve guide.

On completion of this operation the machine spindle 6 is retracted upwardly to the full line position Figure 2 and the milling cutter *a* is slipped off the guide spindle 12. A threading tap *b* is placed on the guide 12. The spindle 6 is then lowered to the full line position shown in Figure 3 to engage the sleeve projections 8' with the drive notches *b'* of the tap.

The machine spindle 6 is then definitely locked against either axial or rotative movement by means of a suitable locking clamp or other device indicated at 18, Figure 3, in its locking position.

The collar flange 7 is provided with one or more radial holes 7' and bar handles 19 are inserted therein by means of which the collar and extending sleeve portion 8 are rotated about the rigidly held spindle 1.

The pitch of the threads on the portion 2 corresponds with the pitch of the threads on the tap *b* so that as the sleeve 8 is rotated about the fixed spindle 1 the said sleeve will be threaded downwardly and will not only rotate the tapping die *b* but will positively feed same downwardly to effect a positive commencement of the threading operation so that the wall of the annular milled orifice will be accurately and positively threaded.

On completion of the threading operation the collar 7 may then be rotated in the reverse direction to retract the threading die and the spindle locking device 18 may be swung upwardly to its unlocked position (Figure 2) and the machine spindle may be then raised as shown in the said Figure 2, whereupon the tapping die *b* may be removed.

The valve seat *c* which is in the form of an externally threaded ring is then placed over the guide spindle 12 and may be partially threaded by hand to start the thread, whereupon the machine spindle is again lowered and locked by the member 18, a guide sleeve *c'* being preferably first inserted below the sleeve 8 and the threaded seat member *c* to form a positive drive connection therebetween as shown in Figure 4. Thus by rotating the collar flange 7 in the manner above defined the valve seat insert may be threaded very tightly in place.

To finally finish off the upper surface of the valve seat insert an end mill, similar to the end mill *a*, but of larger diameter, may then be placed over the guide spindle 12, and the machine spindle rotated with the parts as indicated in Figure 1 to face off the upper surface of the valve seat insert.

It will thus be seen that the various operations are carried out with extreme accuracy while the device is accurately supported by its connection with the machine spindle so that no special jigs are required to be bolted into place and the locking of the machine spindle against either rotation or axial movement brings the threading feature of the device into play.

If desired the milling operation may be carried out first in connection with the entire complement of valve seats to be inserted, after which the threading operations may be carried out successively.

The support 15 may be capable of any suitable adjustment to bring the valve guides into axial alignment with the machine spindles, and while I have defined my device particularly in connection with a drill press having a rotatable and sliding spindle, I do not desire to be limited in this regard, since the support 15 may, if desired, be the axially movable member during the milling operation.

The spindle 6 may be a lathe spindle since my device may be applied in connection with a lathe if desired, or where a suitable drill press is not available.

What I claim as my invention is:—

1. A device for installing valve seats comprising a spindle adapted to be rotatably mounted at one end and having an intermediate external threaded portion terminated in an annular shoulder, a collar threaded on the threaded portion of said spindle and having an internal annular shoulder adapted to engage the aforesaid spindle shoulder to effect rotation of the two members in unison, said collar having a sleeve extension and said spindle having a cylindrical extension fitting snugly therein, means for guiding the extremity of said sleeve and spindle extensions, means for effecting rotation of said collar on the spindle to threadedly separate the same axially during a machining operation, and a machining tool associated with the sleeve extension of said collar.

2. In a device for installing valve seats in an engine block or head having a valve guide, the combination of a guide member to be inserted in the valve guide and having a guide head portion extending centrally of the valve seat, a machining tool engageable in guiding contact with said guide head and adapted to be slipped over the upper end thereof without removal of said guide member, a tool driving member formed of inter-threaded axially adjustable parts, one of said inter-threaded parts having a portion to engage and rotatably interlock with the machine tool and the other of said inter-threaded parts having an axial guide bore extending inwardly from the lower end for a short distance to receive said guide head, means for rotatably interlocking said inter-threaded parts, means rotatably mounting said tool driving member and being axially adjustable in one direction to move said respective inter-threaded parts concurrently into cooperative relation to said machining tool and guide head, and being adjustable in the reverse axial direction to clear the respective inter-threaded members from the machining tool and guide head respectively to permit ready removal or insertion of the machining tool, said last-mentioned axially adjustable means being adapted to be locked to rigidly support the said axially bored threaded member at the end opposite to that engaging the guide head, and said tool engaging member threaded thereon being threadedly rotatable on the said other member to perform a subsequent operation in the installing of the valve seat.

RICHARD BURSTON.